United States Patent [19]
Chow et al.

[11] Patent Number: 5,784,887
[45] Date of Patent: Jul. 28, 1998

[54] TARGETED FLUID DELIVERY SYSTEM

[76] Inventors: Winston Chow, P.O. Box 10412, Palo Alto, Calif. 94303; Yusuf G. Mussalli, 245 Summer St., Boston, Mass. 02210; Barry C. Syrett, P.O. Box 10412, Palo Alto, Calif. 94303

[21] Appl. No.: 478,514

[22] Filed: Jul. 7, 1995

Related U.S. Application Data

[62] Division of Ser. No. 307,383, Sep. 14, 1994, Pat. No. 5,442,921, which is a continuation of Ser. No. 20,629, Feb. 22, 1993, abandoned.

[51] Int. Cl.⁶ .................. F01K 25/06; F01B 31/00
[52] U.S. Cl. .................. 60/657; 60/646; 165/95
[58] Field of Search .................. 165/95; 60/646, 60/657, 692

[56] References Cited

U.S. PATENT DOCUMENTS

| Re. 28,476 | 7/1975 | Bress | 260/97.6 |
|---|---|---|---|
| 2,350,876 | 6/1944 | Worn | |
| 3,030,182 | 4/1962 | Gollmar | 23/181 |
| 3,123,132 | 3/1964 | Hedgecock | 165/9 |
| 3,179,709 | 4/1965 | Baumann | 260/680 |
| 3,184,398 | 5/1965 | Schumacher et al. | 202/46 |
| 3,225,823 | 12/1965 | Fröhlich | 165/69 |
| 3,400,754 | 9/1968 | Barbu et al. | 165/1 |
| 3,709,793 | 1/1973 | Bress | 203/4 |
| 3,745,063 | 7/1973 | Fisher | 162/15 |
| 3,769,795 | 11/1973 | Rostrom | 60/106 |
| 3,884,650 | 5/1975 | Woerner et al. | 55/54 |
| 3,898,134 | 8/1975 | Greenfield et al. | 203/6 |
| 3,917,508 | 11/1975 | Greenfield et al. | 159/47 |
| 4,244,749 | 1/1981 | Sachs et al. | 134/1 |
| 4,251,557 | 2/1981 | Shimose et al. | 426/417 |
| 4,297,224 | 10/1981 | Macchiarolo et al. | 210/755 |
| 4,366,003 | 12/1982 | Korte et al. | 134/18 |
| 4,375,991 | 3/1983 | Sachs et al. | 134/1 |

(List continued on next page.)

FOREIGN PATENT DOCUMENTS

| 1960909 | 6/1971 | Germany. |
|---|---|---|
| 44193 | 2/1990 | Japan. |
| 563073 | 7/1944 | United Kingdom. |
| 2130677 | 6/1984 | United Kingdom. |

OTHER PUBLICATIONS

Stone & Webster Engineering Corporation, Condensor–Targeted Chlorination Design, Oct., 1985, entire text.
Stone & Webster Engineering Corporation, Condensor–Targeted Chlorination Demostration at Brayton Point Station—Unit 2, Feb., 1991, entire text.

*Primary Examiner*—Weilun Lo
*Attorney, Agent, or Firm*—Bernhard Kreten

[57] ABSTRACT

A targeted fluid delivery system (110) is provided for delivering a treatment fluid (F) into tubes (I) of a tube and shell type heat exchanger such as in a condenser (C), typically used in a power plant. The system (110) targets the treatment fluid (F) delivery to separate regions (R) of tubes (I) such that the concentration of the treatment fluid (F) within the tubes (I) of the targeted region (R) is greater than a concentration of the treatment fluid (F) upon mixing with water from other tubes (I) outside of the targeted region (R) at an outlet (O). The system (110) includes a plurality of manifold tiles (160) oriented in fixed relationship to a tubesheet (100) of the condenser (C) at an inlet thereof such that the manifold tiles (160) are rigidly held in place, but do not block the tubes (I) of the condenser (C). The treatment fluid (F) is delivered to the tubes (I) through injectors (180) in the manifold tiles (160). The treatment fluid (F) is delivered to the manifold tiles (160) through fluid conduits (40) which pass through a waterbox (W) of the condenser (C). The fluid conduits (40) are coupled to a control valve (30) which allows the treatment fluid (F) to be directed to individual fluid conduits (40) in sequence without requiring adjustment of elements within the waterbox (W). As an alternative to the manifold tiles (160), a tubesheet (600) can be provided with injectors (680) embedded therein.

20 Claims, 8 Drawing Sheets

U.S. PATENT DOCUMENTS

| | | | |
|---|---|---|---|
| 4,398,592 | 8/1983 | Baron et al. | 165/95 |
| 4,406,836 | 9/1983 | Miserlis | 260/419 |
| 4,531,571 | 7/1985 | Moss | 165/1 |
| 4,552,659 | 11/1985 | Tabata et al. | 210/177 |
| 4,562,885 | 1/1986 | Pausch | 165/84 |
| 4,583,586 | 4/1986 | Fujimoto et al. | 165/95 |
| 4,586,562 | 5/1986 | Carlson et al. | 165/134.1 |
| 4,608,058 | 8/1986 | Menger | 48/73 |
| 4,631,135 | 12/1986 | Duddridge et al. | 210/764 |
| 4,750,547 | 6/1988 | Sakamoto | 165/84 |
| 4,778,653 | 10/1988 | Kamimura et al. | 422/6 |
| 4,846,894 | 7/1989 | Clem et al. | 134/1 |

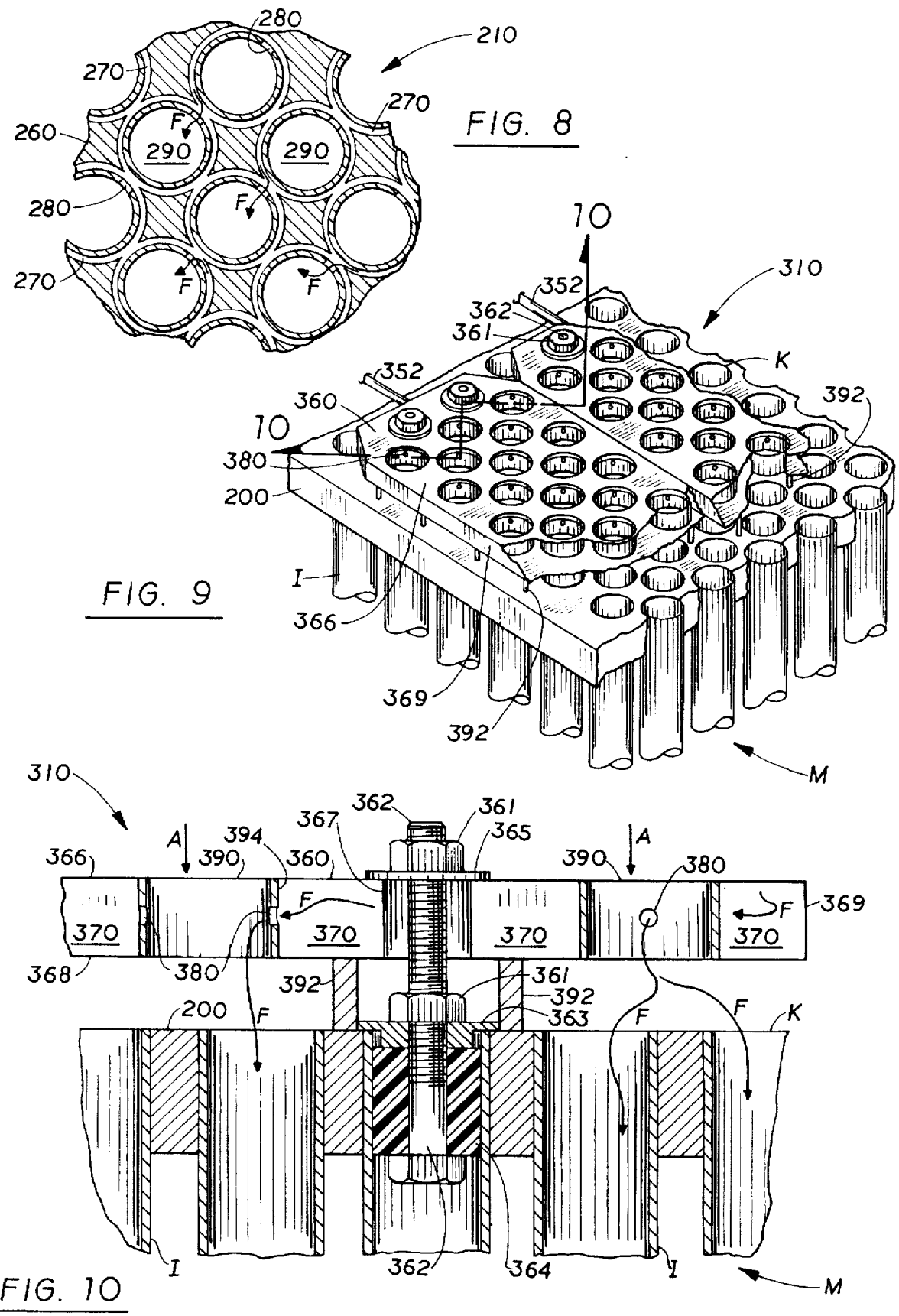

TARGETED FLUID DELIVERY SYSTEM

This application is a divisional application of Ser. No. 08/307,383, filed Sep. 14, 1994, now U.S. Pat. No. 5,442,921 and which is a continuation application of Ser. No. 20,629, filed Feb. 22, 1993, now abandoned.

FIELD OF THE INVENTION

The following invention relates to fluid delivery systems that facilitate directing a treatment fluid into tubes of a heat exchanger, such as is found in a power plant condenser, where the treatment fluid mixes with a traditional heat transfer fluid, such as water. More specifically, this invention relates to fluid delivery systems which allow the treatment fluid to be directed sequentially to each of several groups of tubes in the power plant condenser. A unique feature of these targeted delivery systems is that the treatment fluid is delivered very close to the face of the condenser tubesheet (or to the inlets of the tubes) and no moving parts are required within the waterbox.

BACKGROUND OF THE INVENTION

Heat exchangers, such as condensers in steam power plants, are often comprised of a set of tubes having cold water passing through the interior thereof and steam passing over the exterior thereof. The cold water directed through the interior of the tubes often carries with it a variety of biological substances which may adhere to and grow on the interior surfaces of the tubes. This biological fouling of the tubes reduces the rate of heat transfer in the condenser. This reduces the efficiency of the power plant, requiring that the power plant be taken offline periodically for manual cleansing of the tubes.

Biofouling has been effectively controlled by injecting chlorine, bromine, hot water, or other biocides into the cold water stream. The condensers in steam power plants usually discharge their cooling water directly into the environment (e.g. river, lake or ocean). Often, the treatment fluids added to the cooling water are hazardous to the environment when delivered in the high concentrations necessary to be effective.

Condenser tubes incur leaks on occasion which allows the cooling water to contaminate the steam passing over the tubes. Since such contamination can cause substantial corrosion problems and increased maintenance requirements in other parts of the power plant, efforts are made to detect and fix tube leaks as quickly as possible. One leak detection strategy requires injection of sulfur hexafluoride ($SF_6$) or some other leak detection fluid, into tubes of the condenser.

Attempts have been made to deliver high concentrations of treatment fluid (i.e. biofouling control or leak detection agent) to only a fraction of the total number of tubes initially and then to deliver the treatment fluid sequentially to other groups of tubes, so that eventually all tubes are treated before the targeting cycle begins again. An advantage of this targeted treatment approach is that the targeted tubes receive the high concentration of treatment fluid needed for effective biofouling control (or tube leak detection) while the discharge is diluted in the outlet waterbox with the untreated water from the non-targeted tubes. Thus, the cooling water effluent leaving the plant does not pose an environmental threat.

One known fluid delivery system of this nature uses fixed nozzles which are activated sequentially to direct relatively high doses of treatment fluid to selected areas of an inlet tubesheet of the condenser. The fixed nozzles are mounted on the rear of the inlet waterbox of the condenser and deliver high velocity jets. While this fixed nozzle design is effective, it has a number of disadvantages. The fixed nozzle design requires relatively large nozzles (4 to 6 inches in diameter) and high treatment fluid flow rates (2,000 to 3,000 gallons per minute) to restrict the treatment fluid to the targeted area and overcome the dispersion tendency caused by waterbox turbulence. This requires a large external distribution piping and valve system. Another disadvantage of the fixed nozzle design is that the nozzles are located on the rear of the waterbox, a significant distance away from the tubesheet. This results in uneven distribution of treatment fluid to the tubes and requires that an excessive amount of treatment fluid be delivered to ensure adequate concentrations at all of the targeted tubes.

Another attempt that involves directing the treatment fluid to only a portion of the tubes at a time is described in U.S. Pat. No. 4,531,571 to Moss. Moss teaches the use of a fluid delivery system which includes a moveable manifold directly adjacent to the tubesheet. The manifold is moved to deliver fluid to different tubes by being rotated about a pivot. The device taught by Moss is inherently susceptible to jamming of the moveable manifold thereby disabling the system. A breakdown such as this requires some down time of that condenser to allow access to the interior of the waterbox.

SUMMARY OF THE INVENTION

The targeted fluid delivery system of this invention delivers a treatment fluid directly to the tubesheet in the inlet waterbox without requiring moving parts within the waterbox. Furthermore, this invention eliminates the need for high velocity jets to overcome the dispersion of the treatment fluid caused by waterbox turbulence. This invention results in a high level of fluid targeting efficiency with very little of the treatment fluid being directed to non-targeted tubes.

The invention provides a fluid delivery system which is targetable to regions of the tubesheet and sequentially delivers the treatment fluid only into one of several subsets of the tubes which collectively define a set of all of the tubes of the heat exchange device. In this way, only the tubes of the targeted region receive the required high concentration of treatment fluid therein. However, at the outlet end of the condenser, the treated water leaving the targeted tubes mixes with the untreated water leaving the non-targeted tubes. The resulting mixture is therefore discharged with a treatment fluid concentration which is only a small fraction of the concentration experienced within the targeted region. In this way, the treatment fluid has been diluted to permittable levels. Successive regions of tubes may be targeted such that ultimately all of the tubes of the heat exchanger will receive the treatment fluid for a designated period of time.

All moving parts of the fluid delivery system are located outside of the waterbox so that maintenance and reliability of the fluid delivery system are maximized. The treatment fluid is delivered from a fluid source, through a control valve and into one of a plurality of fluid conduits. Each conduit passes into the waterbox and delivers the treatment fluid to a region dedicated to that conduit.

The treatment fluid is delivered into the tubes of the region by injection out of a plurality of ports located in a group of manifold tiles. Alternatively, the ports can be embedded within the tubesheet, eliminating the need for manifold tiles. The tiles are held in fixed relationship close to the tubesheet and the tiles overlie the tubesheet. Each manifold tile has tube entry holes to allow the heat transfer fluid (e.g. water) to pass into the condenser tubes with minimal obstruction. The treatment fluid is thus accurately directed into only specific tubes which are adjacent to the manifolds within the targeted region. The tiles are especially useful to retrofit an existing condenser with the targeted fluid delivery system. Tiles are merely fastened in place over the tubesheet with connections to fluid conduits which provide the treatment fluid to the tiles from outside the waterbox. Embedding the ports in the tubesheet is especially useful in new condenser construction.

Other advantages and results of the invention are apparent from the following detailed description of the invention and from the accompanying drawings.

BRIEF DESCRIPTION OF THE DRAWINGS

FIG. 8 is a sectional view of a portion of the manifold tile shown in FIG. 7 revealing further details thereof.

FIG. 9 is a perspective view of a plurality of manifold tiles spaced a short distance away from the tubesheet, the figure having portions of the tubesheet and manifold tiles cut away to reveal interior details thereof.

FIG. 10 is a cross-sectional view of the manifold tile shown in FIG. 9 showing how the tile is fastened to the tubesheet in a manner creating a space therebetween.

DESCRIPTION OF PREFERRED EMBODIMENTS

Figure 1:
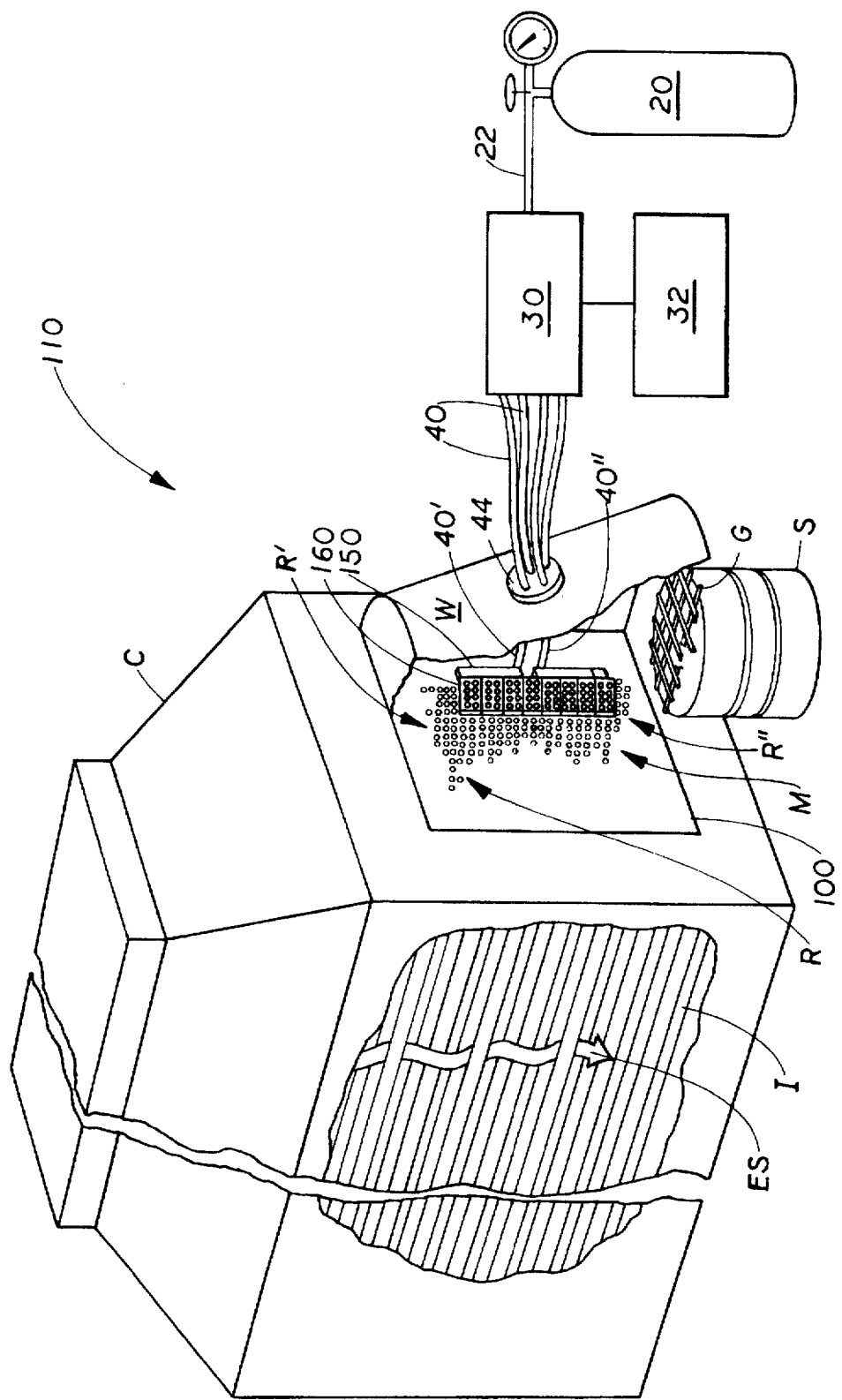
FIG. 1 is a perspective view with some parts cut away and some parts shown schematically to illustrate details of a targeted fluid delivery system configured upon a shell and tube type heat transfer device.

Embodiment #1: Manifold Tile With Injection At Front Face Of Tile

Considering the drawings wherein like reference numerals denote like parts throughout, reference numeral 110 is directed to a fluid delivery system. The fluid delivery system 110 (FIGS. 1 and 2) is disposed adjacent to a tubesheet 100 which supports a plurality of tubes I arrayed in a tube matrix M. The schematic depiction of a shell and tube type heat exchanger shown in FIG. 2 could represent a condenser C of a power plant P.

Figure 2:
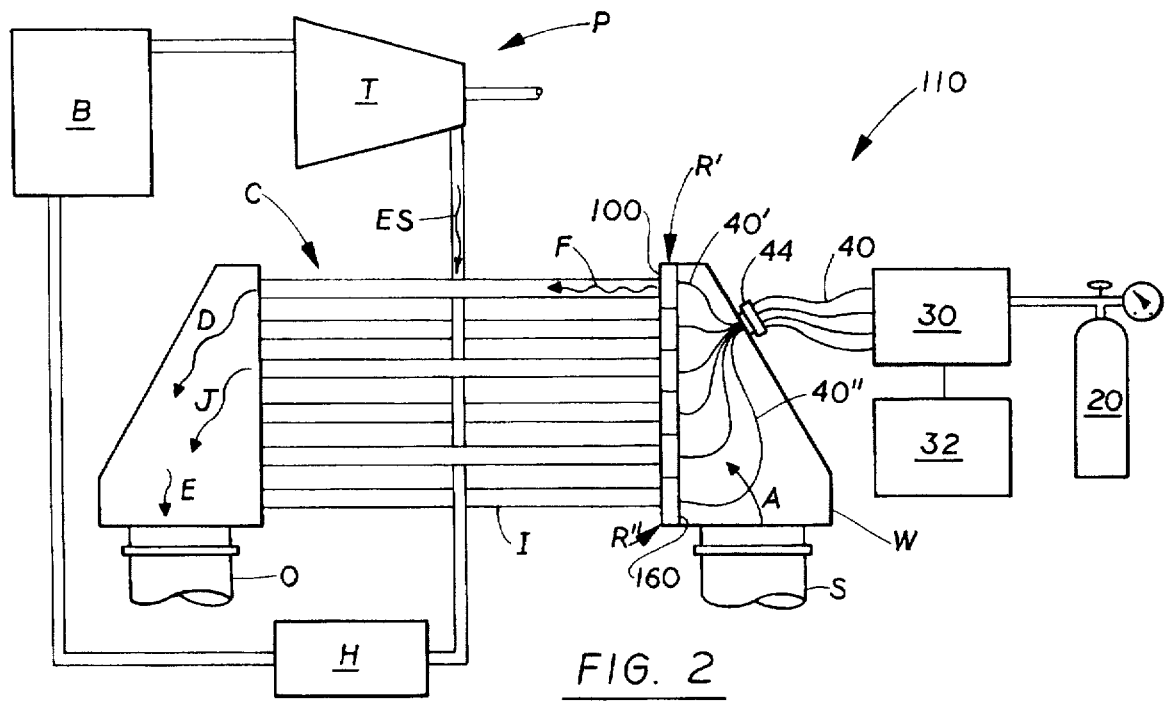
FIG. 2 is a schematic view of the targeted fluid delivery system incorporated within a condenser of a power plant.

Referring to FIG. 2, note that the condenser C is only one element of a power plant P. The power plant P also includes a feedwater pump H, a boiler B, and a steam turbine T. Exhaust steam ES (or other exhaust fluid) exiting the turbine T passes along exteriors of the tubes I within the condenser C, causing the steam ES to change state from a gas to a liquid.

Figure 3:
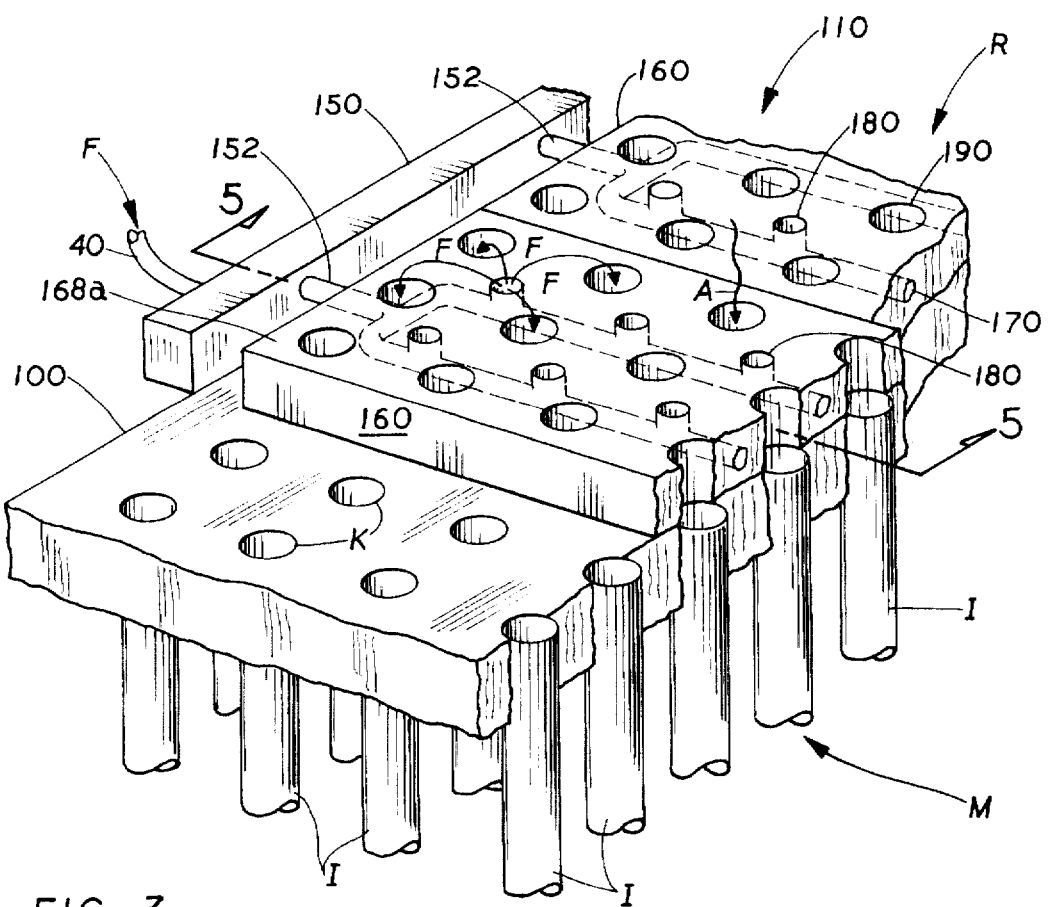
FIG. 3 is a perspective view of a portion of that which is shown in FIG. 1 revealing a plurality of manifold tiles in position adjacent to a tubesheet, and having treatment fluid injectors on the front faces of the tiles.

In essence, and referring to FIGS. 1 through 3, the fluid delivery system 110 is composed of a plurality of manifold tiles 160. Each manifold tile 160 is oriented adjacent to the tubesheet 100 which is contained within a waterbox W. Tube entry holes 190 pass through the manifold tiles 160 allowing an inlet water flow A to pass from inlet supply S, through waterbox W and then through the tubesheet 100 and thereafter into the tubes I of the tube matrix M. All of the tubes I in the matrix M define a set. The set is divided into subsets. Each subset is addressed by one or more manifold tiles 160.

A treatment fluid source 20 outside of the waterbox W of the condenser C stores the treatment fluid F before delivery by the manifold tiles 160. The fluid source 20 directs the fluid F through a control valve 30 and into one of a plurality of fluid conduits 40. The fluid conduits 40 pass into the waterbox W and connect to a plenum chamber 150. The plenum chamber 150 then delivers the fluid F to a plurality of associated manifold tiles 160 which are oriented in a region R composed of a subset of the entire tube matrix M targeted for fluid F delivery.

The treatment fluid F is one of a variety of gases or liquids which an operator of the condenser C wishes to deliver into tubes I of a heat exchanger used as a condenser C of a power plant P. One such group of fluids are referred to as oxidizing biocides and include chemicals such as chlorine and bromine. Non-oxidizing biocides may also be used. These biocides are introduced into the tubes I to inhibit the collection of biological deposits within the tubes I. Steam or hot water may also be used as a biocide by increasing water temperatures within the targeted tubes above tolerable limits (i.e. 95° F.) for the organisms residing within the tubes.

The targeted fluid delivery system 110 can also be used to deliver leak detecting fluids such as sulphur hexafluoride ($SF_6$), which, when placed into the tubes I, will pass through tube leaks along with the cooling water, and can be detected by a sensitive $SF_6$ sensor in the condenser steam space. Preferably, the treatment fluid F also includes some water mixed with the pure biocide or leak detecting fluids. Thus the treatment fluid F is a mixture of water and biocide or leak detecting fluid before introduction into the waterbox W.

Each manifold tile 160 has a plurality of interior passageways 170 which deliver the fluid F to fluid injectors 180. The injectors 180 are positioned to direct the fluid F into adjacent tubes I. When the region R targeted for fluid F delivery has received the fluid F for a specified period of time, the control valve 30 is adjusted to direct the fluid F into a different fluid conduit 40 connected to a different plenum chamber 150 in fluid communication with a separate group of manifold tiles 160.

This targeted fluid delivery system 110 thus results in adding a high concentration of fluid F into tubes I of the targeted region R of the tube matrix M without directing any of the fluid F into any non-targeted regions. An outlet O of the condenser C is composed of a combination of an outlet treatment fluid flow D and an outlet untreated water flow J. A combined outlet flow E is created from the two outlet flows D, J. The concentration of treatment fluid F within the combined flow E is thus less than the concentration of treatment fluid F in the outlet fluid flow D. When the fluid F is hot water or steam, a temperature increase at the outlet O is analogous to the fluid F concentration.

More specifically, and referring in detail to FIGS. 1 through 5, details of a first embodiment of the targeted fluid delivery system 110 are shown. Treatment fluid F delivered by the targeted fluid delivery system 110 is initially located within the fluid source 20 which is schematically depicted in FIG. 1 as a compressed gas tank.

The fluid source 20 includes an outlet 22 which directs the treatment fluid F to a control valve 30. The control value 30 includes a system capable of directing fluid F from the fluid source 20 to one of a variety of outlet fluid conduits 40. Any valve capable of selectively delivering the fluid F to different fluid conduits 40 can be used.

Preferably, a controller 32 is coupled to the control valve 30 which controls the adjustment of the control valve 30, causing the fluid F to be delivered to different fluid conduits 40 according to input received from the controller 32. One type of controller 32 would utilize a timer such that the fluid F would be delivered sequentially to each fluid conduit 40 for a specified amount of time. Another type of controller 32 could receive manual inputs from an operator of the targeted fluid delivery system 110. The fluid source 20, control valves 30 and controller 32 are all located outside of the waterbox W where maintenance may be easily conducted without disturbing the operation of the condenser C.

The fluid conduits 40 pass from the exterior to the interior of the waterbox W through a waterbox entry port 44 such that the treatment fluid F may pass without allowing the water within the water flow path A (FIG. 2) to escape from the waterbox W. Note that while the water flow A is often water, other suitable heat transfer fluids could be utilized in its place. The entry port 44 can be incorporated into an existing manhole cover through fittings, such as those known by the trademark "Swagelok", to eliminate the need for fabricating additional waterbox W openings.

The fluid conduits 40 continue from the waterbox entry port 44 to discrete regions R of the tubesheet 100. Each fluid conduit 40 is dedicated to a region R. For instance, one fluid conduit 40' is dedicated to a region R'. Another fluid conduit 40" is dedicated to a region R". Preferably ten to twelve regions R are designated upon the tubesheet 100 with a separate fluid conduit 40 associated therewith. In this way, the fluid F concentration (or temperature increase) at the outlet O is merely a small fraction of the fluid F concentration (or temperature increase) within the tubes I of the targeted region R.

Each fluid conduit 40 is connected to one plenum chamber 150 and directs fluid F to the connected chamber 150, as shown in FIG. 3. The plenum chamber 150 is a hollow enclosure having an interior which isolates the treatment fluid F from the inlet water flow A (FIG. 2). The plenum chamber 150 has a plurality of manifold inlets 152 (FIGS. 3 through 5) which are in fluid communication with the manifold tiles 160 and deliver the treatment fluid F from the plenum chamber 150 into the manifold tiles 160. Preferably, a plurality of manifold tiles 160 are coupled to the plenum chamber 150 through corresponding manifold inlets 152. A region R is thus defined by that portion of the tubesheet 100 which is overlaid by manifold tiles 160 which have been coupled to a common plenum chamber 150 connected to a single fluid conduit 40.

Each manifold tile 160 includes a plurality of interior passageways 170 therewithin which transport the treatment fluid F to injectors 180 which exit out of the manifold tiles 160 and into fluid communication with the inlet water flow A. The injectors 180 project from the passageways 170. Passageways 170 are shown as forming a closed loop in FIG. 5, but the route taken by the passageways is determined to a large extent by the layout of tubes I in the tube matrix M. Each manifold tile 160 has a plurality of tube entry holes 190 passing entirely through the tile 160. The diameter of the tube entry holes 190 substantially correspond to the diameter of the tubes I. The diameter of the tube entry holes 190 are positioned such that they are aligned co-axially with a corresponding tube I. Thus, when one of the manifold tiles 160 is in place adjacent to the tubesheet 100, the water flow A into inlet ends K of the tubes I is not obstructed by the manifold tiles 160.

The injectors 180 are positioned such that they direct the treatment fluid F to exit the front surface 168a of the manifold tiles 160 in an initial direction opposite to the water flow A. This injector 180 orientation causes the fluid F to be mixed quickly very close to the front surface of the manifold tile 160 with the water flow A, before its direction is reversed and it passes into nearby tube entry holes 190, and then into the tubes I where it can perform its intended function.

FIG. 2 shows that the treatment fluid F eventually passes through the tubes I and into an outlet O of the condenser C. An outlet fluid flow D is comprised of the treatment fluid F and a portion of the water flow A which was directed into the same region R of tubes I as was the fluid F. This outlet fluid flow D then mixes with an outlet water flow J from the non-targeted regions R creating a combined flow E having a fluid F concentration (or, with hot water or steam, a temperature increase) only a fraction of that which exists in the outlet fluid flow D. In this way, a high concentration of treatment fluid F is delivered to the targeted region R, while the outlet combined flow E is maintained with a treatment fluid F concentration low enough (or temperature increase low enough) to avoid any adverse environmental impact.

Action of the fluid F within a region R of the tubes I ensures that adequate cleanliness (lack of biofouling) is maintained on the interior L (FIG. 5) of the tubes I of the condenser C. This, in turn, assures that efficient heat transfer is sustained between the steam ES and the water flow A, E. Where leak detection is the goal, early detection spares the turbine exhaust steam ES from contamination by the cooling fluid.

Embodiment #2: Manifold Tile With Injection Into Tube Entry Holes

Figure 6:
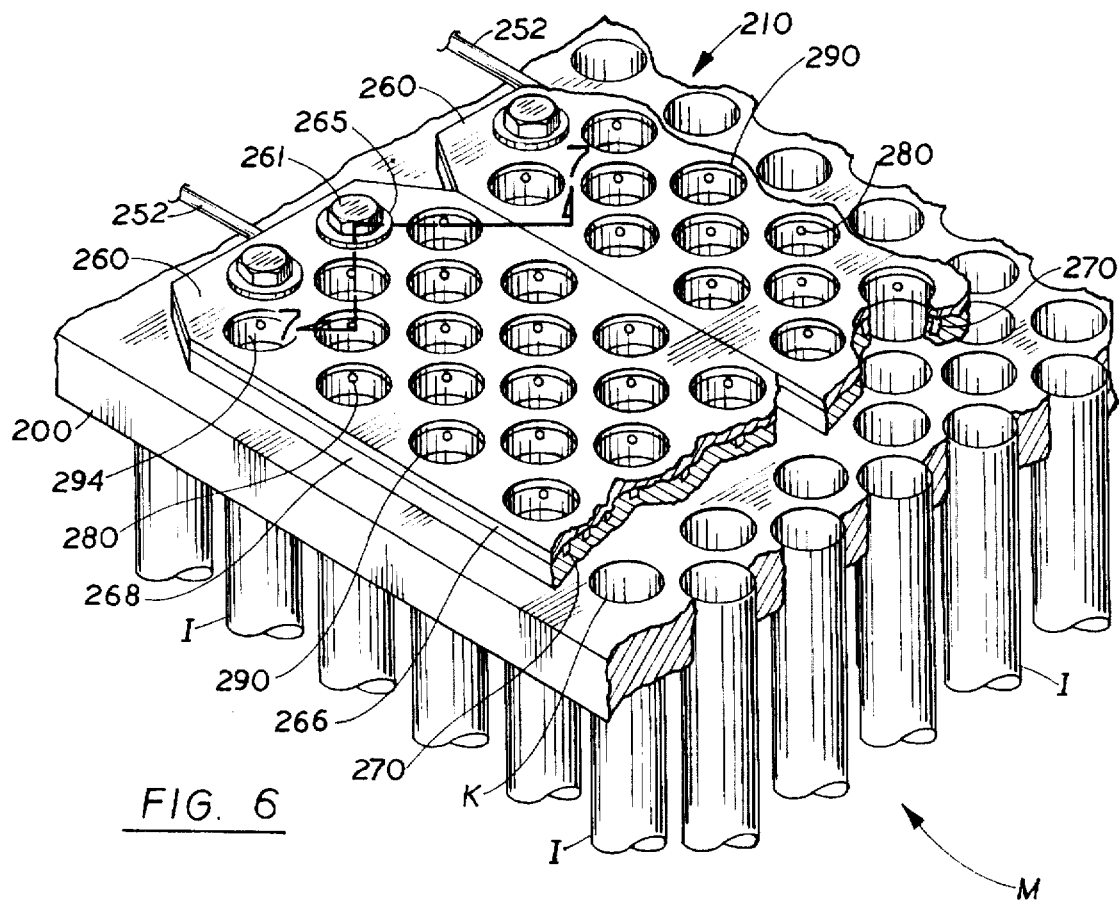
FIG. 6 is a perspective view of a plurality of manifold tiles having injection ports for treatment fluid delivery directly into interiors of the tubes, the figure having portions of the tubesheet and manifold tiles cut away to reveal interior details thereof.
Figure 7:
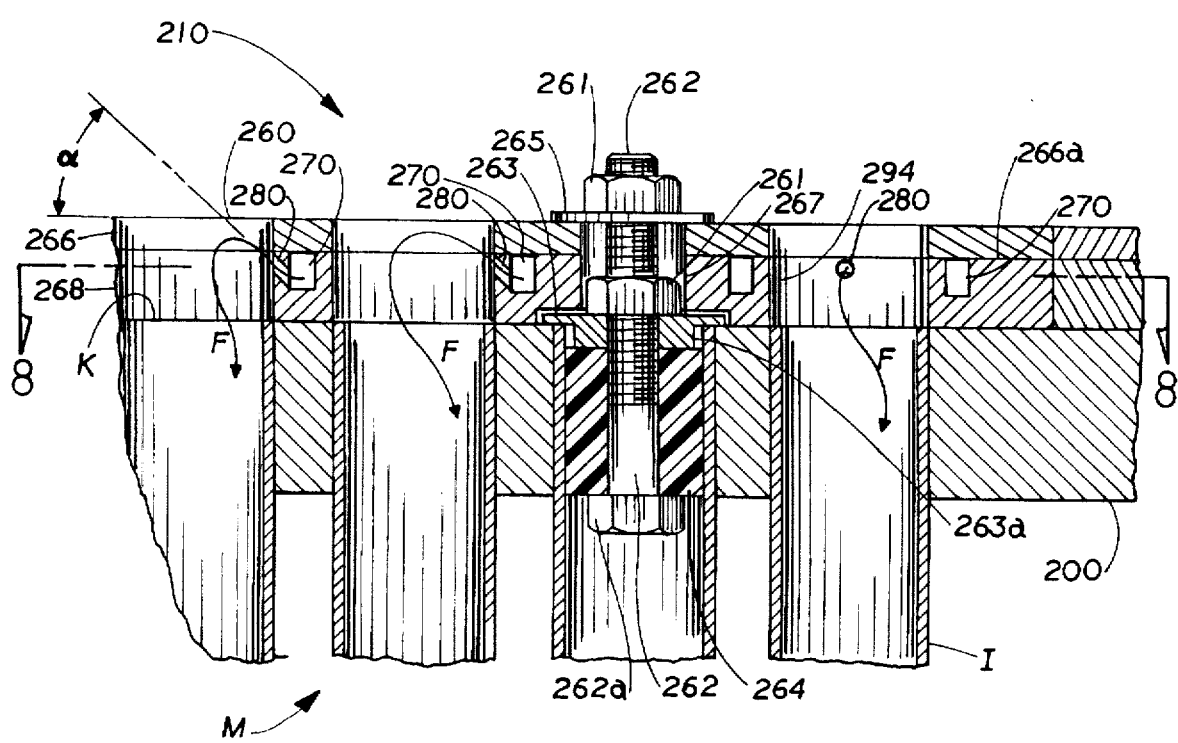
FIG. 7 is a sectional view taken along line 7—7 of FIG. 6 revealing interior details of the manifold tiles, tubesheet and bolt assembly.

Referring now to FIGS. 6 through 8, details of a second embodiment 210 of the targeted fluid delivery system are shown. Note initially that the targeted fluid delivery system 210 of this embodiment utilizes a substantially similar fluid source 20, control valve 30, fluid conduits 40 and plenum chamber 150 as the system 110 of the first embodiment.

Accordingly, details of these components and related components will not be belabored. In essence, the system 210 of this embodiment differs from the system 110 in that injectors 280 direct the treatment fluid F directly into tube entry holes 290 of a manifold tile 260 rather than through the top surface 168a of the manifold tile 160 (FIG. 3).

The plenum chamber 150 (FIGS. 1 and 3) directs the treatment fluid F into manifold inlets 252 which supply the fluid F to the manifold tiles 260. The manifold tiles 260 are placed adjacent to a tubesheet 200 with the tube entry holes 290 formed in the manifold tiles 260 such that they are coaxially aligned with interiors of the tubes I. Each manifold tile 260 includes a plurality of interior passageways 270 which direct the fluid F, via the injectors 280, from the passageways 270 through a side wall 294 formed in the tube entry hole 290 of the manifold tile 260 and located above a corresponding tube I. FIG. 8 shows one possible configuration for the passageways 270.

Figure 4:
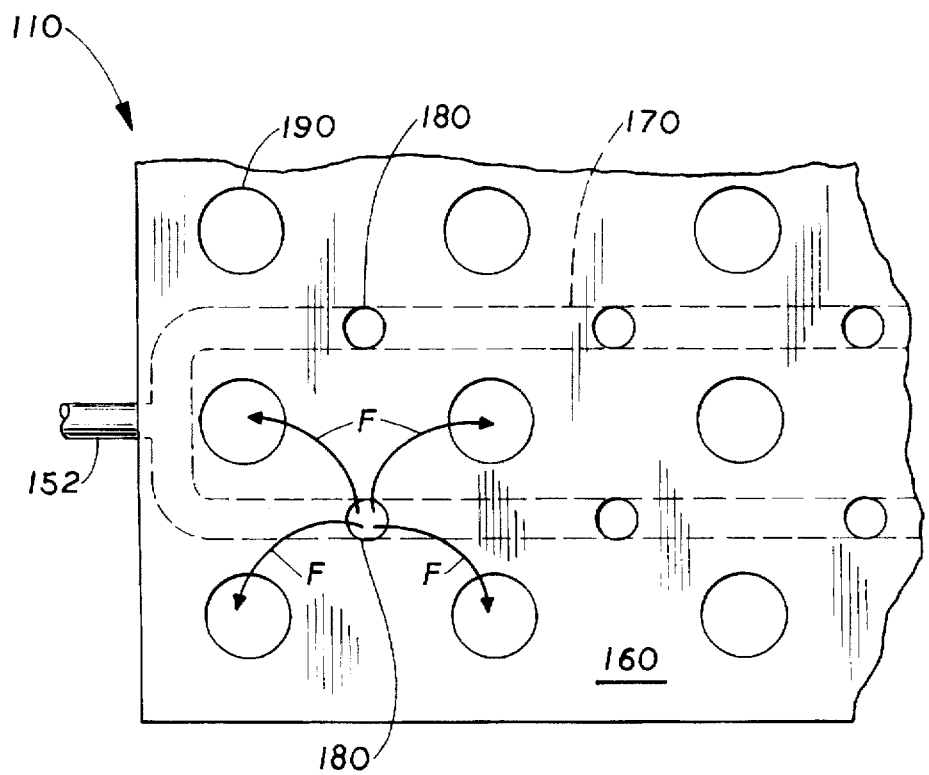
FIG. 4 is a top plan view of a portion of that which is shown in FIG. 3 revealing further details of the manifold tiles.
Figure 5:
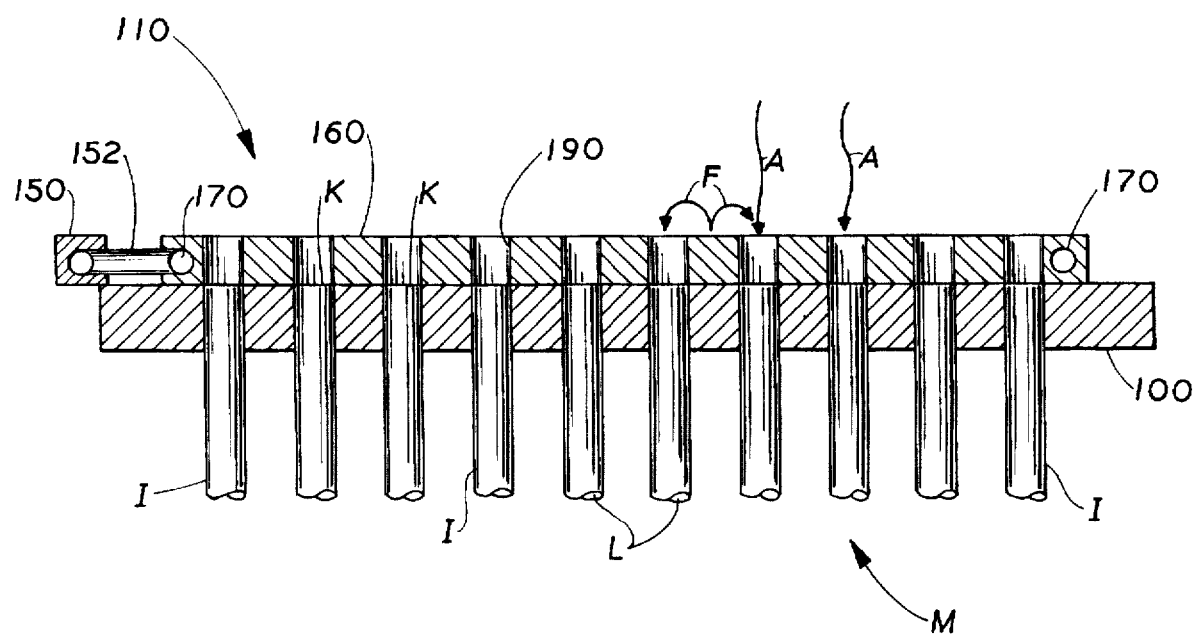
FIG. 5 is a sectional view taken along line 5—5 of FIG. 3 revealing interior details of the manifold tiles and the tubesheet.

Each of the manifold tiles 260 includes a plurality of the tube entry holes 290, each hole 290 having a diameter and orientation which leaves the inlet water flow A substantially unaffected as it passes through the tube entry holes 290 and into the tubes I. Note that the tubesheet 200 has a different tube pattern and density from that which is shown in FIGS. 3 through 5 of the first embodiment. The tube pattern and density of tubes I are two variables in choosing a retrofit tile manifold configuration. While the arrangement of tubes I in the tubesheet 200 are distinct from the arrangement of tubes I in the tubesheet 100, the function of the tube sheets 100, 200 are substantially identical.

The manifold tiles 260 are preferably formed from a top plate 266 and a bottom plate 268. The bottom plate 268 has the interior passageways 270 formed on a top surface 266a thereof such that when the top plate 266 and bottom plate 268 are combined together, the interior passageways 270 are isolated from the inlet water flow A. The injectors 280 form holes between the interior passageways 270 and each of the sidewalls 294 of the tube entry holes 290. Preferably, the injectors 280 are oriented at an angle a away from a plane defined by an exterior surface of the tubesheet 200. This angle a facilitates mixing of the treatment fluid F with the inlet water flow A at an early stage, ensuring that the treatment fluid F is uniformly mixed with water flow A when delivered to the tubes I. Angle a can be 90° (injection radially into the tube) or can be greater or less than 90° so that treatment fluid F is injected in the downstream or upstream direction, as required by the design parameters. Sixty degrees (upstream) is shown in FIG. 7.

The manifold tiles 260 are preferably attached securely to the tubesheet 200 preventing the manifold tiles 260 from becoming displaced and obstructing the inlet water flow A. Tile 260 attachment can be achieved through a variety of common attachment methods. For instance, the tiles 260 could be welded in place, bolted directly to the tubesheet 200 or attached to brackets securely mounted within the waterbox W. One preferable means for manifold tile 260 attachment to the tubesheet 200 includes an attachment bolt 262 and radially expandable plug 264 located within a tube I of the tube matrix M and detailed in FIG. 7.

The attachment bolt 262 includes a head 262a oriented distant from the manifold tile 260 and within tube I. The radially expandable plug 264 has a central hole such that the plug 264 surrounds the attachment bolt 262 which passes through the hole. The plug 264 is also within the tube I. A stop plate 263, which has a diameter greater than the diameter of the tube I, has a central bore through which the bolt 262 passes and is located adjacent to the radially expandable plug 264 and distant from the head 262a of the attachment bolt 262. The plate 263 also has a necked down portion 263a which resides within the tube I and abuts against the plug 264. A nut 261 is threaded onto the attachment bolt 262 such that it is adjacent to the stop plate 263 on the side of the plate opposite the plug. Further rotation of the nut 261 draws the attachment bolt 262 through the stop plate 263 thereby compressing and radially expanding plug 264. Compression of the radially expandable plug 264 causes the plug 264 to expand in the radial direction and become securely attached within the tube I. The attachment bolt 262 is thus firmly held within the tube I such that the manifold tile 260 may then be attached thereto.

Attachment of the manifold tile 262 is accomplished through locating the manifold tile 260 adjacent to the tubesheet 200 with a bolt hole 267 of the tile 260 dimensioned to surround the bolt 262. A washer 265 and nut 261 are placed over the bolt 262 and tightened against the tile 260 to fix the manifold tile 260 to the tubesheet 200.

Utilizing this attachment means only a very small number (i.e. less than one percent) of the tubes I are dedicated to attachment of the manifold tiles 260 to the tubesheet 200. This ensures secure attachment of the manifold tiles 260 to the tubesheet 200 without significantly decreasing the number of tubes I available for heat transfer within the condenser C. While this means of tile 260 attachment is detailed with respect to the system 210, this attachment means can be utilized in a similar manner with other embodiments of this invention.

Embodiment #3: Manifold Tile With Tubesheet Stand-Off

Referring now to FIGS. 9 and 10, details of a third embodiment 310 of the targeted fluid delivery system are shown. Features of the targeted fluid delivery system 310 located outside of the waterbox W correspond to features of the earlier described targeted fluid delivery system 110. In essence, the system 310 of the third embodiment differs from the system 210 of the second embodiment in that the tiles 360 are spaced away from the tubesheet 200 by standoffs 392. Also, the tiles 360 have a hollow interior region 370 distinguishable from the interior passageways 270 of the system 210.

The plenum chamber 150 (FIG. 3) directs the treatment fluid F into manifold inlets 352 which direct the fluid F into manifold tiles 360. Each manifold tile 360 of this embodiment includes a top surface 366, a bottom surface 368 and side surfaces 369 confining a hollow interior region 370 which is in fluid communication with the manifold inlet 352. The interior regions 370 include injectors 380 formed within bore walls 394 of tube entry holes 390. Injectors 380 direct treatment fluid F from the interior region 370 to the tube entry holes 390. The tube entry holes 390 may have any of a variety of sizes, shapes and locations so long as inlet water flow A reaches the tubes I with minimal pressure drop while passing through holes 390. This can be achieved by ensuring that the cross-sectional area of all the tube entry holes 390 is no less than the cross-sectional area of all tubes I located beneath the manifold tiles M.

The manifold tiles 360 are spaced away from the tubesheet 200 by standoffs 392. The standoffs 392 ensure that the manifold tiles 360 will not block the water flow A from entering the tubes I especially when the tube entry holes 390 are not aligned with the tubes I. However, the standoffs 392 are short enough to keep the tiles 360 proximate to the tubesheet 200 to ensure that even delivery of treatment fluid F is still accomplished. This fluid delivery system 310 is particularly advantageous in that the tube entry holes 390 are not required to conform in size and location to the tubes I of the tubesheet 200.

The manifold tiles 360 are connectable to the tubesheet 200 through a system analogous to that described with reference to the fluid delivery system 210. However, a longer attachment bolt 362 is preferably utilized to compensate and account for the length of the standoff 392 which elevates the tiles 360 above the tubesheet 200. Ideally, the standoff 392 is integral with the tile surface 368. However, it may also be connected to the stop plate 363. Details of the radially expandable plug 364, stop plate 363, nuts 361, washer 365 and bolt hole 367 are analogous to those described with reference to the fluid delivery system 210.

The treatment fluid F is emitted through the injectors 380 and is then driven toward tubesheet 200 by the force of the inlet water flow A. The fluid F is then carried into tubes I which are adjacent to but spaced from the tube entry holes 390.

Embodiment #4: Overlapping Channel-Shaped Manifold Tiles

Figure 11:
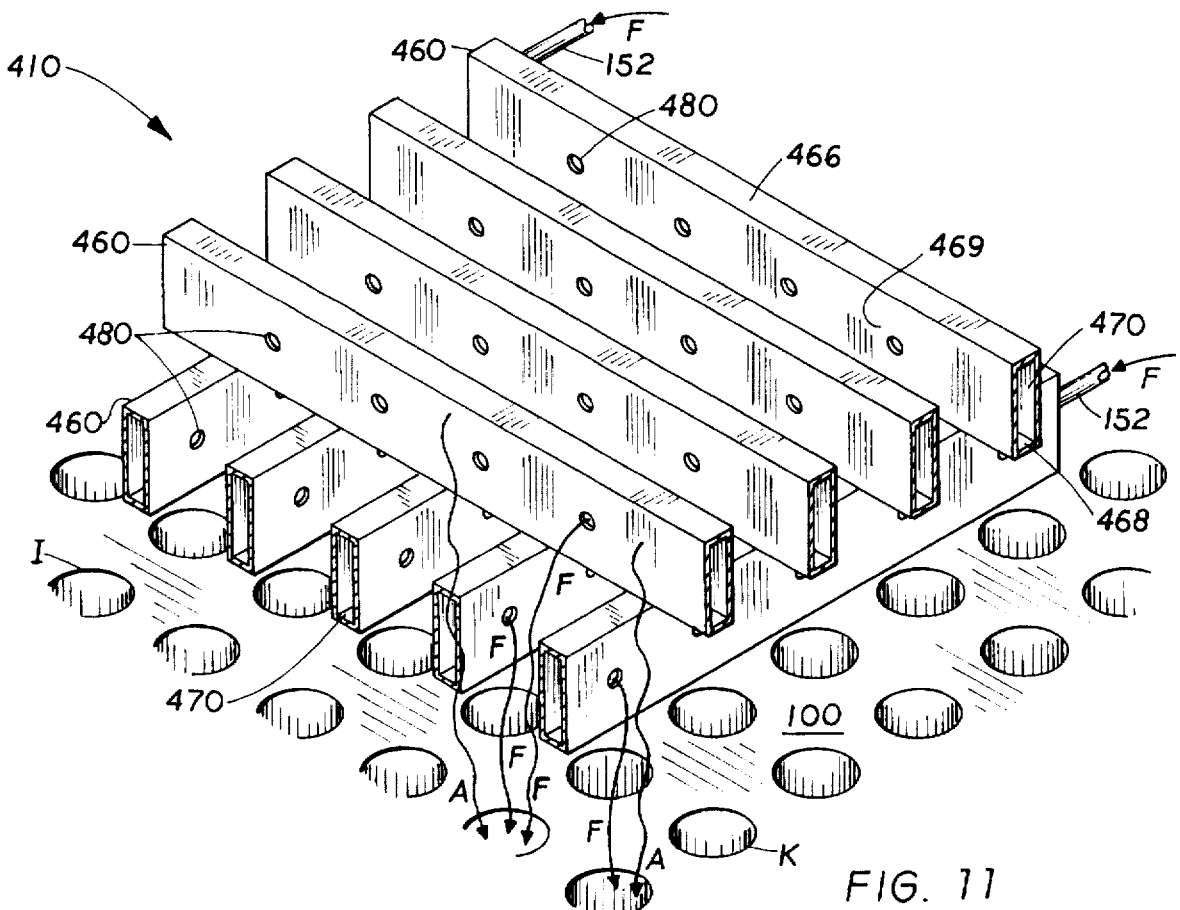
FIG. 11 is a perspective view of a manifold tile arrangement in the form of a lattice structure positioned away from the tubesheet.

Referring now to FIG. 11, a fourth embodiment 410 of the targeted fluid delivery system is shown. Initially, note that the manifold tiles 160, 260, 360 of the previous embodiments which substantially overlie the entire tubesheet 100 are replaced with a plurality of relatively narrow channel-like manifold tiles 460. Each manifold tile 460 is so thin that significant blockage of the inlet water flow A is unlikely.

The manifold tiles 460 receive treatment fluid F therewithin from a manifold inlet 152 and other components upstream therefrom which do not diverge substantially from the components disclosed with reference to the fluid delivery system 110. For details of structures upstream from the manifold tiles 460, reference is made to the system 110 described in detail above.

Each manifold tile 460 is configured as an elongated channel including a top plate 466, a bottom plate 468, and side plates 469. Each side plate 469 includes a plurality of injectors 480. Each injector 480 is in fluid communication both with an interior region 470 of the manifold tiles 460 and the inlet water flow A. Each manifold tile 460 is thus a hollow box shaped channel. Collectively, the tiles 460 are configured in a lattice pattern with upper and lower tiles oriented in a criss-cross pattern which provides added rigidity to the manifold tile structure. The manifold tiles 460 are preferably elevated away from the tubesheet 100. One possible elevation means utilizes standoffs such as the standoffs 392 of the system 310. Elevating the tiles 460 further reduces blockage of the tubes I by the manifold tiles 460. The treatment fluid F is injected from the interior region 470 through the injectors 480 and is then carried by the water flow A into the interiors of the tubes I.

Embodiment #5: Channel-Shaped Manifold Tile

Figure 12:
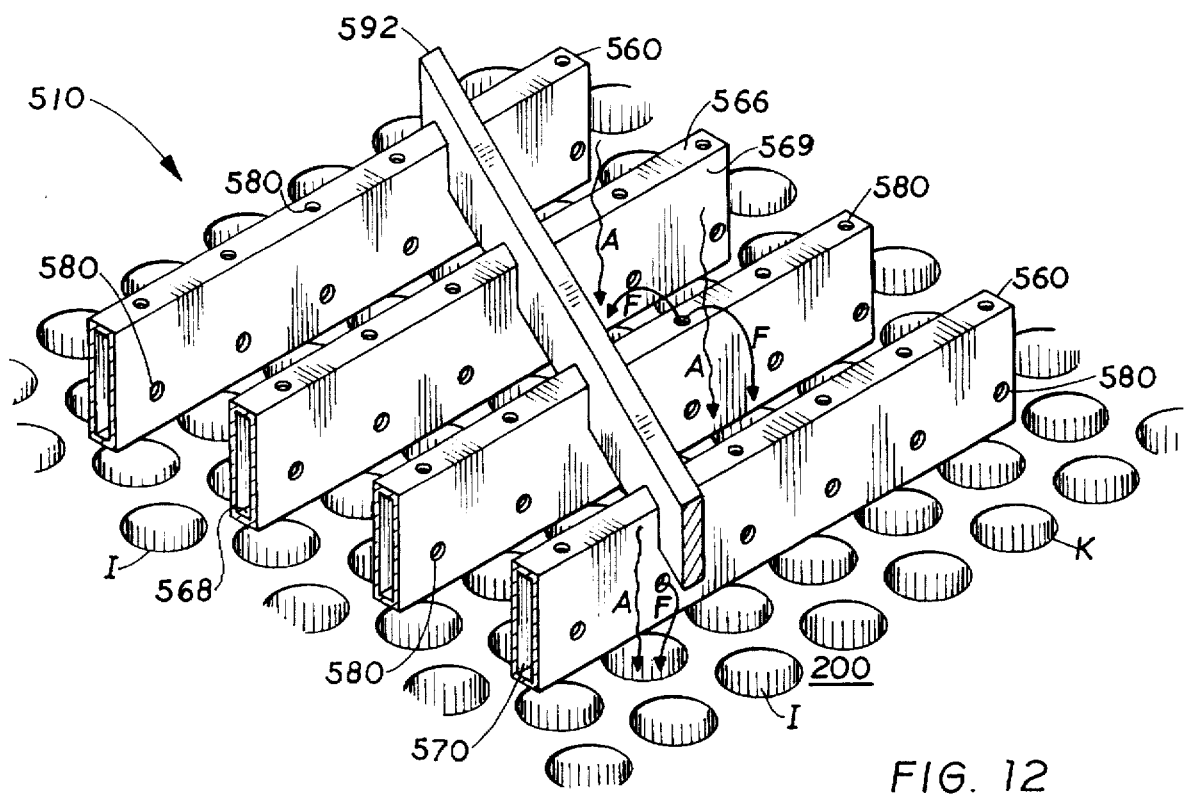
FIG. 12 is a perspective view of a manifold tile arrangement which orients the manifold tiles as channels interposed between rows of tube inlets of the tubesheet, the perspective having portions cut away to reveal interior details of the manifold tiles.
Figure 13:
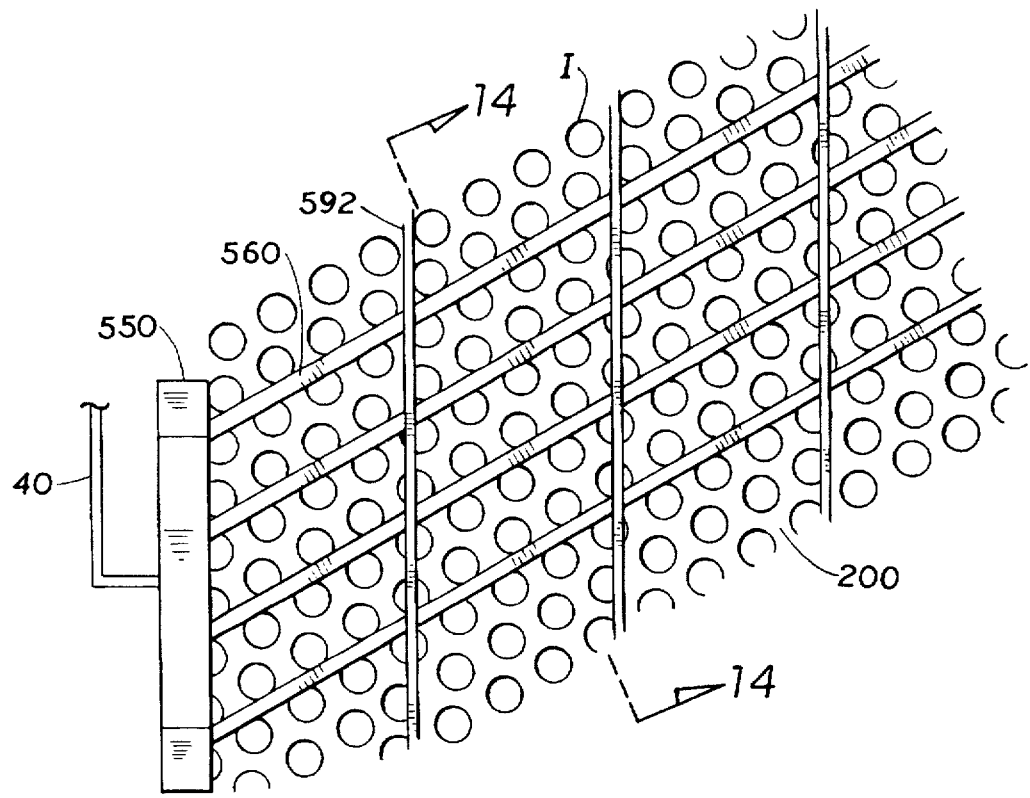
FIG. 13 is a top plan view of that which is shown in FIG. 12 with a plenum chamber connected thereto.
Figure 14:
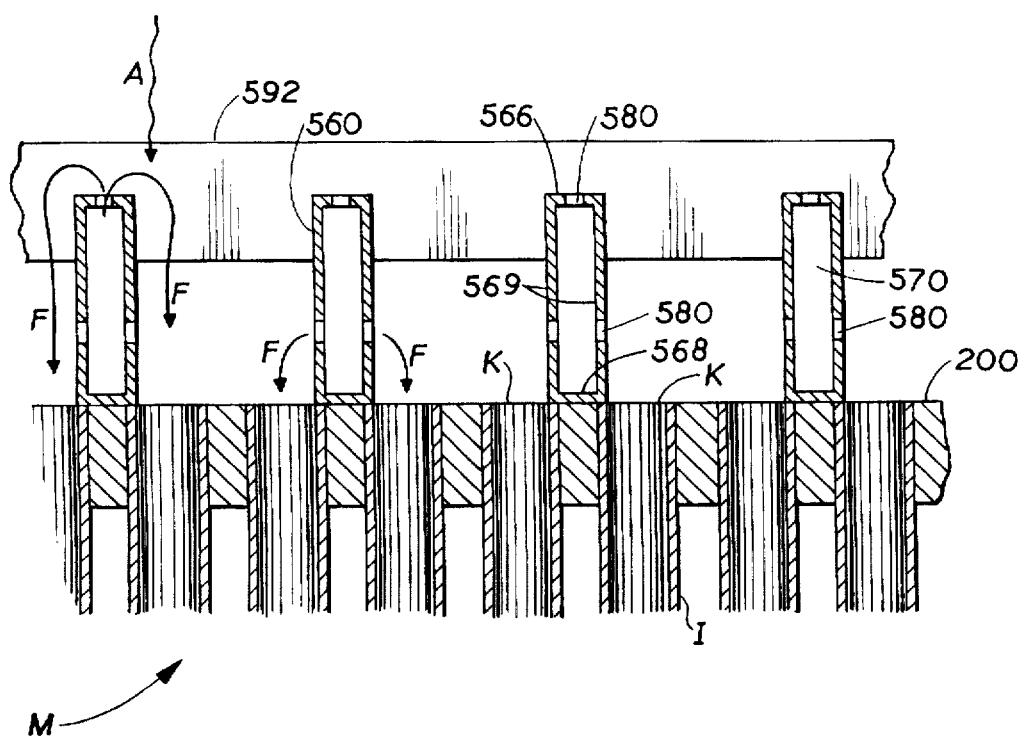
FIG. 14 is a sectional view taken along line 14-14 of FIG. 13 revealing interior details of the manifold tile formed of channels oriented between tubes of the tubesheet.

FIGS. 12 through 14 show a fifth embodiment 510 of the targeted fluid delivery system. In essence, the system 510 is distinguished from the system 410 of the fourth embodiment in that the tiles 560 are all oriented without overlapping and are located directly against the tubesheet 200.

The targeted fluid delivery system 510 includes a plenum chamber 550 (FIG. 13) receiving the fluid F through a system of components similar to those described in detail above with the fluid delivery system 110. The plenum chamber 510 delivers the treatment fluid F to a plurality of the manifold tiles 560. Each manifold tile 560 has an elongate channel-like appearance including a top plate 566 parallel to a bottom plate 568 and two side plates 569. The manifold tiles 560 are preferably oriented such that they avoid blocking the tubes I, however some tube inlet K blockage can occur.

The manifold tiles 560 are oriented directly adjacent the tubesheet 200 and include a plurality of stiffening gussets 592 oriented non-parallel thereto which link adjacent tiles 560 together, providing added rigidity to the manifold tiles 560. Although FIG. 12 shows the gussets 592 at an oblique angle with respect to the tile 560, other angles, such as a right angle could be used. An interior region 570 of each manifold tile 560 is in fluid communication with the plenum chamber 550 (FIG. 13) and directs the fluid F out of the interior region 570 through injectors 580. Each injector 580 is preferably located adjacent to a corresponding tube inlet K in the tubesheet 200. Thus, treatment fluid F is injected out of the injectors 580 and is then carried by the water flow A directly into a corresponding tube I. In addition, or as an alternative, the injectors 580 can be located through the top plate 566. With the injectors 580 located in the top plate 566, the treatment fluid F is provided with an additional distance for added mixing with the water flow A. Treatment fluid F exiting through the top plate 566 is thus directed to a plurality of adjacent tube inlets K.

Embodiment #6: Tubesheet With Sub-Surface Channels

Figure 15:
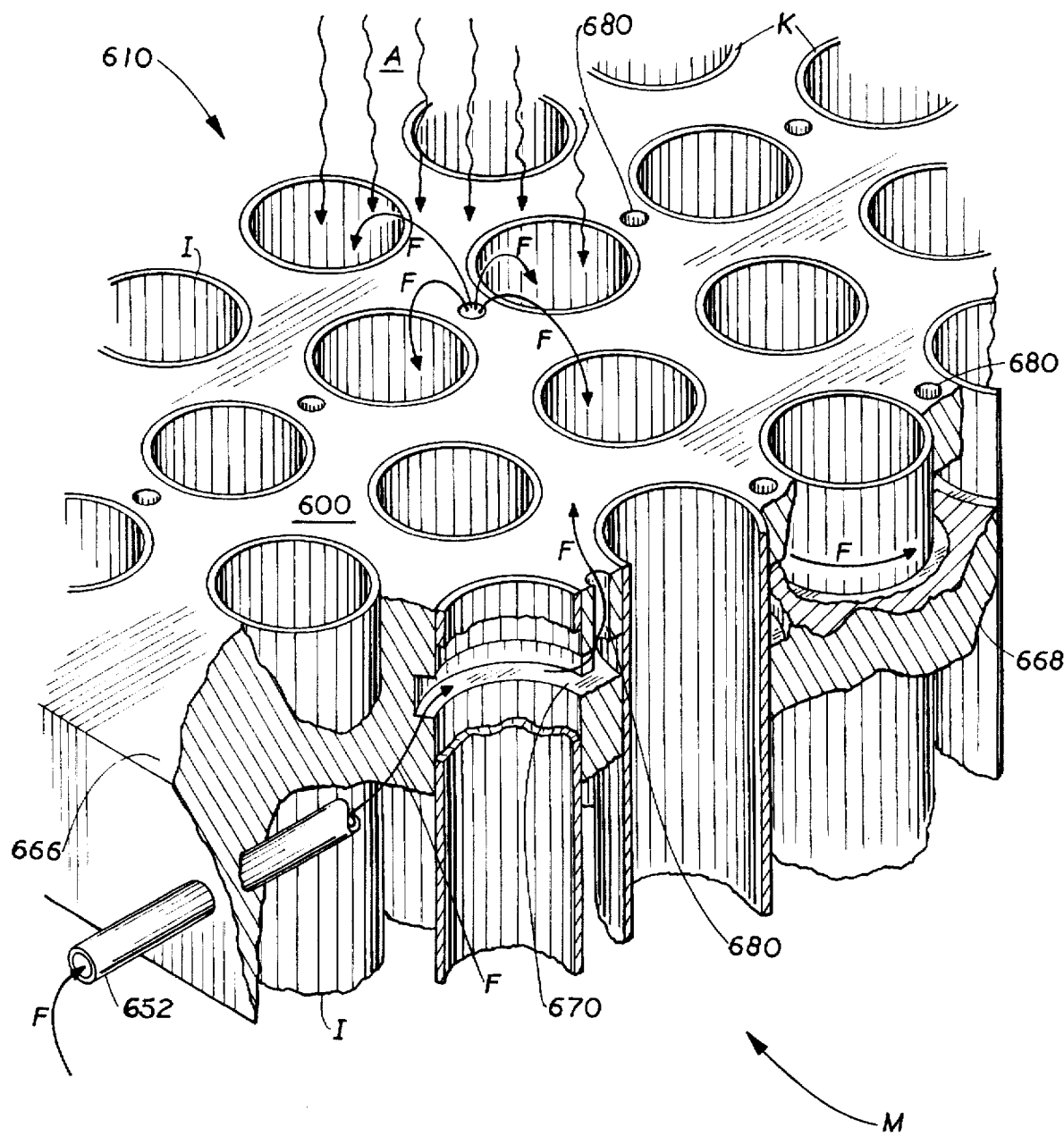
FIG. 15 is a perspective view of a portion of the tubesheet with portions thereof cut away to reveal interior details of the tubesheet, showing how features of a manifold tile can be incorporated into the tubesheet itself to provide a treatment fluid delivery system for a new heat exchanger.

Referring now to FIG. 15, a sixth embodiment 610 of the targeted fluid delivery system is shown. In essence, the system 610 of the sixth embodiment differs from the previous embodiments in that the tiles 110, 210, 310, 410, 510 are replaced by a tubesheet 600 having the system 610 incorporated internally therewithin. The targeted fluid delivery system 610 includes a tubesheet 600 having a plurality of interior passageways 670 formed therewithin. Each interior passageway 670 is supplied with treatment fluid F through tubesheet fluid inlets 652. Each tubesheet fluid inlet 652 is connected to a corresponding plenum chamber 150 (FIG. 3). Details of the plenum chamber 150 and other upstream components differ from the components of the fluid delivery system 110 only in that they are configured to interface with the inlets 652 of the tubesheet 600.

The tubesheet 600 has a top surface 666 facing the waterbox W (FIGS. 1 and 2) and a bottom surface 668 parallel to and opposite the top surface 666. The interior passageways 670 include injectors 680 which pass between the interior passageways 670 and the top surface 666 of the tubesheet 600. Treatment fluid F is thus directed through the interior passageway 670 and through the fluid injectors 680 such that the fluid F is delivered out of the top surface 666 of the tubesheet 600. The water flow A then directs the fluid F into adjacent tube inlets K. Interior passageways 670 of the tubesheet 600 are divided into sub-regions having separate tubesheet fluid inlets 652 and separate plenum chambers 150 connected to separate fluid conduits 40 (FIG. 1). In this way, treatment fluid F is delivered to separate regions R of the tubesheet 600 when the control valve 30 is adjusted. This sixth embodiment lends itself to new construction whereas the previous versions were amenable to retrofitting.

Use And Operation

In use and operation, each of the targeted fluid delivery systems 110, 210, 310, 410, 510, 610 functions in the following manner. Initially, the manifold tiles 160, 260, 360, 460, 560 are located within the waterbox W and adjacent the tubesheet 100, 200 (or the tubesheet 600 is installed in the condenser C). Attachment of the manifold tiles 160, 260, 360, 460, 560 to the tubesheet 100 can be accomplished in a manner similar to that described in reference to the system 210 (FIG. 7).

Plenum chambers 150, 550 are provided in fluid communication with the manifold tiles 160, 260, 360, 460, 560 (or tubesheet 600). Each plenum chamber 150, 550 has a corresponding fluid conduit 40. The fluid conduits 40 pass through the waterbox W and are connected to the control valve 30. The fluid source 20 is coupled to the control valve 30.

When an operator of the condenser C wishes to utilize the targeted fluid delivery system 110, 210, 310, 410, 510, 610, the operator manipulates the controller 32 to cause the control valve 30 to direct the treatment fluid F from the fluid source 20 into one of the fluid conduits 40. This causes the fluid F to be directed to one of the plenum chambers 150, 550 within one of the regions R. Treatment fluid F is then ejected from the manifold tiles 160, 260, 360, 460, 560 (or tubesheet 600) at a location near the tubes I of that region R, allowing the fluid F to be carried into the tubes I of the region R by the inlet water flow A.

The inlet water flow A originates through an inlet supply S (FIGS. 1 and 2) and passes through a grate G which prevents large articles from fouling the tubes I. The inlet water flow A then passes beyond the system 110, 210, 310, 410, 510, 610 and into the tubes I. The treatment fluid F is combined with the inlet water flow A near the tube inlets K. The treatment fluid F is then provided within the tubes I for performing the functions corresponding to the treatment fluid F utilized.

The fluid F then passes beyond the tubes I as an outlet treatment fluid flow D. The flow D is comprised of the treatment fluid F and a portion of the water flow A which enters the tubes I of the designated region R. The outlet fluid flow D is then combined with an outlet water flow J from regions R which are not targeted to receive the fluid F and discharged within the outlet O. The outlet fluid flow D and outlet water flow J are thus combined to form an outlet combined flow E. The outlet combined flow E is characterized by having a lesser concentration of the treatment fluid F (or lesser temperature) than does the outlet fluid flow D.

After a designated treatment fluid F delivery period has elapsed, the operator can adjust the control valve 30 through the controller 32 to cause the fluid F to pass into a different fluid conduit 40 and hence into a separate plenum chamber 150, 550 and to a separate region R for delivery of the treatment fluid F thereto. The operator may thus cycle the treatment fluid F through a plurality of separate regions R of the tubes I in the tube matrix M without elevating a treatment fluid F concentration in the outlet combined flow E to a level which is detrimental to the environment. When the treatment fluid F is hot water or steam, this cycling ensures that most of the tubes I contain water at a non-elevated temperature such that heat transfer out of the steam ES is not significantly decreased.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. In a power plant in which exhaust fluid exiting downstream from a turbine is cooled by means of a heat exchanger, and in which a heat exchange fluid for the heat exchanger passes into a plurality of tubes each having an inlet which receive the heat exchange fluid, the tubes are deployed in a matrix in the heat exchanger for heat transfer from the exhaust fluid passing over the tubes, the improvement comprising:

a means for adding a first fluid to the heat exchange fluid adjacent at least one said inlet of each said tube of said matrix, said first fluid adding means integrated within said matrix of tubes to provide unobstructed access for the heat exchange fluid at each said tube inlet.

2. The power plant improvement of claim 1 wherein said means for adding said first fluid includes means to selectively deliver said first fluid to a series of subsets of tubes in the tube matrix adjacent said inlets of the tubes, said means of selective delivery including a valve means; whereby said means of selective delivery is switched from one subset to a different subset of tubes in the tube matrix so that said first fluid treats different subsets as a function of said valve means.

3. The power plant improvement of claim 2 wherein the heat exchange fluid is directed through a waterbox and into the tube matrix and is isolated from the exterior environment; and said valve means is located outside of said waterbox, and said valve means is held in fluid communication with said means of selective delivery means located within said waterbox through a plurality of fluid conduits passing from an exterior of said waterbox to an interior of said waterbox.

4. The power plant improvement of claim 3 wherein said selective delivery means is a tubesheet integrally formed with and securely holding each said inlet of each of the tubes of the tube matrix, said tubesheet defining a barrier between the heat exchange fluid and the exhaust fluid of said power plant, said tubesheet having a plurality of interior passageways therewithin in fluid communication with said fluid conduits connected to said valve means, said interior passageways having fluid injection openings extending to said inlets of said tubes providing fluid communication between the tubes of the tube matrix and said interior passageways;

said first fluid is delivered from said valve means to the tubes of the tube matrix via said fluid injection openings and passageways of said tubesheets.

5. The power plant improvement of claim 4 wherein said interior passageways connect to said fluid conduits via fluid inlets formed on said tube sheet.

6. The power plant improvement of claim 5 wherein said tubesheet has a top surface facing the waterbox and a bottom surface parallel and opposite said top surface.

7. The power plant improvement of claim 6 wherein said interior passageways include fluid injectors having said fluid injection openings which terminate at said top surface of said tubesheet to deliver said first fluid into an area directly upstream said tube inlets to allow said first fluid to mingle with the heat exchange fluid and pass into said tubes.

8. The power plant improvement of claim 7 wherein said interior passageways are divided into subregions each having separate said fluid inlets so that separate regions of said tubesheets selectively receive said first fluid as a function of orientation of said valve means.

9. The power plant improvement of claim 8 wherein said first fluid includes a non-oxidizing biocide therein.

10. The power plant improvement of claim 8 wherein said first fluid is chosen from a group including hot water and steam.

11. The power plant improvement of claim 8 wherein said first fluid includes a substance utilizable for leak detection in the tubes.

12. The power plant improvement of claim 8 wherein said first fluid includes an oxidizing biocide therein.

13. In a power plant in which exhaust fluid exiting downstream from a turbine is cooled by means of a heat exchanger, and in which a heat exchange fluid for the heat exchanger passes into a plurality of tubes each having an inlet which receive the heat exchange fluid, the tubes are deployed in a matrix in the heat exchanger for heat transfer from the exhaust fluid passing over the tubes, the improvement comprising:

a means for adding a first fluid to the heat exchange fluid adjacent at least one said inlet of each said tube of said matrix, said first fluid adding means integrated within said matrix of tubes to provide unobstructed access for the heat exchange fluid at each said tube inlet wherein said tubes are fixed in said matrix by a tubesheet surrounding said tubes adjacent said inlets, and passageways pass through said tubesheet delivering said first fluid to openings on said tubesheet adjacent said outlet.

14. The power plant improvement of claim 13 wherein said means for adding said first fluid includes means to selectively deliver said first fluid to a series of subsets of tubes in the tube matrix adjacent said inlets of the tubes, said means of selective delivery including a valve means; whereby said means of selective delivery is switched from one subset to a different subset of tubes in the tube matrix so that said first fluid treats different subsets as a function of said valve means.

15. The power plant improvement of claim 14 wherein the heat exchange fluid is directed through a waterbox and into the tube matrix and is isolated from the exterior environment; and said valve means is located outside of said waterbox, and said valve means is held in fluid communication with said means of selective delivery means located within said waterbox through a plurality of fluid conduits passing from an exterior of said waterbox to an interior of said waterbox.

16. The power plant improvement of claim 15 wherein said interior passageways are divided into subregions each having separate said fluid inlets so that separate regions of said tubesheets receive said first fluid.

17. The power plant improvement of claim 16 wherein said first fluid includes a non-oxidizing biocide therein.

18. The power plant improvement of claim 15 wherein said first fluid is chosen from a group including hot water and steam.

19. The power plant improvement of claim 15 wherein said first fluid includes a substance utilizable for leak detection in the tubes.

20. The power plant improvement of claim 15 wherein said first fluid includes an oxidizing biocide therein.

* * * * *